United States Patent [19]
Steigelmann et al.

[11] 3,844,735
[45] Oct. 29, 1974

[54] PROCESS
[75] Inventors: Edward F. Steigelmann; Robert D. Hughes, both of Park Forest, Ill.
[73] Assignee: Standard Oil Company, Chicago, Ill.
[22] Filed: Sept. 13, 1972
[21] Appl. No.: 288,782

[52] U.S. Cl. .................................................. 55/16
[51] Int. Cl. ............................................. B01d 53/22
[58] Field of Search ............................... 55/16, 158

[56] References Cited
UNITED STATES PATENTS
3,365,276  1/1968  Childs ..................................... 55/16
3,455,817  7/1969  Modell .................................... 55/16

Primary Examiner—Charles N. Hart
Attorney, Agent, or Firm—Morton, Bernard, Brown

[57] ABSTRACT

There is described the separation of aliphatically unsaturated hydrocarbons from gaseous mixtures by the combined use of liquid barrier permeation and metal complexing techniques. The liquid barrier is present essentially in a solid matrix that is a film membrane or is in contact with a film membrane, and the barrier contains complex-forming metal ions in aqueous solution. The liquid barrier is in contact with a relatively non-volatile, hygroscopic agent that may be in solution in the liquid barrier or composited with the solid matrix. This agent may serve to reduce the loss of water from the liquid barrier which loss may otherwise be excessive. The hygroscopic agent when composited within a hydrophilic film membrane, may serve to increase the permeability of the film and maintain the strength of the film when it is swollen with the aqueous liquid barrier. The metal ions in the liquid barrier may be, for example, noble metal, nickel, mercurous, cuprous or other metal ions, and mixtures of the metal ions, with or without other cations, may be used. The separation of ethylene from ethane and methane is of particular interest.

22 Claims, No Drawings

PROCESS

This invention relates to the separation of aliphatically unsaturated hydrocarbons from gaseous mixtures containing the hydrocarbons to be separated, along with other material. More particularly, this invention is concerned with the separation of aliphatically unsaturated hydrocarbons by the combined use of liquid barrier permeation and metal complexing techniques. The liquid barrier is present essentially in a solid matrix that is a film membrane or is in contact with a film membrane, and the barrier contains complex-forming metal ions in aqueous solution. The liquid barrier is in contact with a relatively non-volatile hygroscopic agent in solution in the liquid barrier or composited with the solid matrix. This agent serves to reduce the loss of water from the liquid barrier which may otherwise be excessive. The hygroscopic agent when composited within a hydrophilic film membrane, may serve to improve the permeability of the film and maintain the strength of the film when it is swollen with the aqueous liquid barrier. The invention is especially useful for separating ethylene from gaseous mixtures containing it, other hydrocarbons, for example, one or both of ethane and methane, and with or without hydrogen.

There is considerable commercial interest in separating aliphatically unsaturated hydrocarbons from mixtures containing them. These unsaturated hydrocarbons are reactive materials that serve in various roles, generally as intermediates in chemical syntheses. A number of the unsaturated hydrocarbons are employed as monomers in the formation of polymers and in this regard, olefins such as ethylene, propylene, butadiene and isoprene are well known. These olefins, as well as other unsaturated materials, for instance, acetylene, are also used to form relatively low molecular weight products.

The aliphatically unsaturated hydrocarbons are most often available on a commercial basis in admixture with other chemical compounds, frequently other hydrocarbons. These unsaturated hydrocarbon-containing streams are usually by-products of chemical syntheses or separation processes. When the hydrocarbon streams are liquid under normal conditions or can readily be made so, ordinary distillation techniques can be used to separate the hydrocarbon components providing they have sufficiently different boiling points for the process to be economically feasible. Especially when the hydrocarbon mixtures contain materials having close boiling points, which is often the case with hydrocarbons of the same number of carbon atoms or having a difference of only one carbon atom, distillation may not be an attractive separation procedure. In such cases, more costly processes are often used and involve operations such as solvent extraction or extractive distillation which entail considerable expense, if indeed they are technically feasible in a given situation.

When the mixture containing the aliphatically unsaturated hydrocarbon is in an essentially gaseous state at normal or ambient conditions of temperature and pressure, separation of the desired component from the mixture may be even more troublesome. In these situations, cryogenic processes may be used, but they are expensive. The components of these normally gaseous mixtures may not even have particularly close boiling points, but nevertheless the mixture must be cooled in order to separate one or more of its components. In spite of the considerable cost of cryogenic operations, the procedure has been employed commercially for the separation of ethylene from other gaseous materials such as ethane and methane.

Our copending U.S. Pat. application Ser. No. 252,607, filed May 12, 1972 now U.S. Pat. No. 3,758,603 is directed to a method for separating aliphatically unsaturated hydrocarbons from gaseous mixtures containing them, and involves the combined use of liquid barrier permeation and metal complexing techniques which can exhibit high selectivity factors. In the process the liquid barrier is an aqueous solution containing metal ions which will complex with the aliphatically unsaturated hydrocarbon to be separated. This liquid barrier is in contact with a semi-permeable film membrane which may be a synthetic polymer. We have found that when the liquid barrier is disposed in a solid matrix that is the film membrane or is in contact with the film membrane, the passage of the gaseous material subjected to the separation procedure may remove excessive amounts of water from the film thereby reducing the selectivity of the separation and the length of time the process may be run without replenishing the water of the liquid barrier. The loss of water may reduce or even destroy the selective permeability characteristics of the system and may cause the precipitation of metal components from the solution which may reduce the permeability of the film or otherwise make it less useful in the separation process. Also the presence of the aqueous liquid barrier solution in a hydrophilic film membrane may lessen the permeability of the film and may physically weaken the film to an undesirable extent.

In the present invention we reduce this undesirable loss of water from the liquid barrier by having it in contact with a relatively non-volatile, hygroscopic agent. The hygroscopic agent when composited within a hydrophilic film membrane, may serve to improve the permeability of the film and maintain the strength of the film when it is swollen with the aqueous liquid barrier. The hygroscopic agent may be water-soluble and dissolved in the liquid barrier or the agent may be composited with the matrix holding the liquid barrier even if the agent is essentially insoluble in the liquid barrier. The hygroscopic agent is often used in an amount sufficient to reduce the water loss that would occur in the operation should the hygroscopic agent not be employed. The amount of this agent present may be a minor amount, for instance, about 0.01 to 50 weight percent, of the liquid barrier solution, preferably about 0.5 to 10 weight percent, on a metal salt-free basis. The use of hygroscopic agents increases the effective life of the separation procedure while reducing requirements of water replenishment which may otherwise be necessary to maintain separation selectivity over longer periods of operation. Also an improvement in olefin separation selectivity may be obtained due to the presence of the hygroscopic agent.

The hygroscopic agent can be added to the aqueous liquid barrier or the matrix before the liquid barrier and matrix are brought together. Alternatively, or in addition, the hygroscopic agent may be added to the liquid barrier or the matrix as the separation proceeds. The latter type of addition may be made in any suitable manner, for instance, by including the agent in the gaseous feedstock passing into contact with the liquid barrier and the matrix. The hygroscopic agent may be added to the film membrane-forming components, with or without the aqueous solution of the complex-forming metal ions, and the subsequently formed film contains the hygroscopic agent.

The hygroscopic agents which can be employed in this invention may be soluble or insoluble in the aqueous liquid barrier at the conditions of use of the film membrane, and the agents are essentially inert to the complexing metal solution and the gaseous mixture undergoing separation. It may be preferred to employ a water-soluble hygroscopic agent in solution in the liquid barrier when the latter is disposed in a solid matrix adjacent to the film membrane, and in these systems the film membrane is often of the essentially hydrophobic-type. By compositing the hygroscopic agent within the film membrane, a film which might otherwise have properties that are more hydrophobic than desired may be made sufficiently hydrophilic to perform better in the process of this invention. The film membrane may with advantage be sufficiently hydrophilic to absorb at least about 5 weight percent of water when immersed in distilled water for one day at room temperature and pressure. The film membrane may exhibit such hydrophilic properties especially when the liquid barrier is to be disposed within the film membrane, and it is preferred that the film have this characteristic without the addition of the hygroscopic agent, but the latter or other additives may serve to impart increased hydrophilic properties to the film membrane. The hygroscopic agents are relatively nonvolatile, e.g., having a partial pressure at 25°C. of less than about 50 mm. of Hg, preferably less than about 1 mm. of Hg. The hygroscopic agents are exemplified by the polyvinyl alcohols, polyacrylic acids, polyvinyl ethers, polyoxyalkylene glycols and their carboxylic acid esters, and the like. Non-polymeric hygroscopic agents include ethylene glycol, glycerol and porpylene glycol, and the agents may also be alkylated carboxycellulose derivatives such as methyl and ethyl carboxycellulose. Thus the agents are frequently composed essentially of carbon, hydrogen and oxygen, and, for instance, may be polyols, polyethers, polyether esters and the like. The hygroscopic agents should not unduly deleteriously affect the complex-forming reaction in the system of this invention or react with the film membrane in a disadvantageous manner. Thus the agent should not cause precipitation of the complex-forming metal or make it inactive, or dissolve the polymer film. When composited within the film membrane, the hygroscopic agents are often present in the film in minor amounts, say about 0.1 to 40 weight percent based on the total weight of the semi-permeable membrane without this agent and the liquid aqueous complexing solution. Preferably, this amount may be about 1 to 20 weight percent, although in some situations the hygroscopic agent is preferably used in greater amounts. Thus in the case of composites of nylon and polyvinyl alcohol, preferred compositions may contain about 25 to 75 weight percent of each of these materials, more preferably about 35 to 55 percent polyvinyl alcohol and about 45 to 65 percent nylon.

In the method of the present invention, the mixture containing the aliphatically unsaturated hydrocarbon to be separated is essentially in the gaseous or vapor phase when in contact with a liquid barrier having dissolved therein one or more metal ions which form a complex with the unsaturated hydrocarbon. The liquid barrier is in contact with a semi-permeable membrane which is essentially impermeable to the liquid but permeable to the aliphatically unsaturated hydrocarbon-containing mixture at the conditions used during the separation. In the present invention the liquid barrier is essentially in a solid matrix that is the semi-permeable membrane or such matrix is in contact with the membrane. This type of liquid barrier can be formed by using the semi-permeable membrane in a number of ways, and the membrane can be said to immobilize the liquid barrier in, or adjacent to the feed side of, the membrane. Thus the liquid barrier may be held between two solid, gas permeable films which prevent passage of the liquid therethrough. In this structure the liquid barrier may be absorbed in a porous, essentially solid matrix adjacent the film membrane, for example, the porous matrix may be a cellulose acetate filter. Alternatively, the porous matrix containing the liquid barrier may be placed adjacent the feed side of the film membrane without having an additional film or other supporting structure on the feed side of the matrix. The liquid barrier may be placed essentially completely within the supporting film membrane structure providing the liquid does not leave the structure in undue amounts under the conditions of operation, considering the ability to replenish the liquid lost. There is little, if any, passage for the gaseous feedstock across the separation zone except by becoming part of the liquid barrier phase, and thus the liquid barrier controls the selectivity of the liquid barrier-semi-permeable membrane combination.

In the system of the present invention in which the aqueous barrier is within the film membrane, the amount of complex-forming metal in the semi-permeable membrane may vary considerably but is sufficient to accomplish the desired separation. Often this is a minor amount, say, about 1 to 50 weight percent, of the weight of the membrane on a non-aqueous basis, preferably about 5 to 25 weight percent. A preferred procedure for placing the solution of complex-forming metal in the semi-permeable film is by contacting the film with the solution and exerting a differential pressure across the solution and film. Thus the pressure behind the solution is greater than that on the opposite side of the film and as a result the solution is forced into the film under pressure. Conveniently the pressure on the solution is above atmospheric and the opposite side of the film is essentially at atmospheric pressure. The pressure differential need not be large, for instance, it may only be at least about 5 or 10 psi, and it should not be so great that the film is ruptured. This procedure could also be used to reactivate films which have been used to the extent that they have lost selectivity.

The film membranes employed in the process of this invention to support or otherwise be in contact with the liquid barrier are of the essentially solid, water-insoluble, semi-permeable type. In the absence of the liquid containing the complex-forming ions the film is not adequately selective with respect to the passage of or permeation by the aliphatically unsaturated hydrocarbon to perform the separation to the desired extent. Often the film is permeable to essentially all of the components in the feedstock used in this invention when they are in the gaseous phase. However, by having the aqueous liquid form a barrier the simple diffusion of gas through the film is reduced or prevented, and the components of the feed stream must therefore traverse the film primarily by becoming part of and then being separated from the aqueous liquid phase. Thus in the absence of the complexing metal ion in the aqueous medium, there could be a slight separation of hydrocarbons effected by the use of water as the liquid medium since the individual hydrocarbons may exhibit differing solubilities in water. In the method of the present invention, however, the selectivity of the separation of aliphatically unsaturated hydrocarbons is greatly increased due to the presence of the complexing metal ions in the aqueous barrier medium contacting the film. If desired, water may be replenished in the barrier medium as the separation proceeds, by, for instance, adding water to the hydrocarbon feed stream or in another suitable manner. Alternatively the process may be stopped intermittently for the addition of water to the liquid barrier.

The film membranes which can be employed in this invention serve to prevent the passage of significant amounts of liquid materials through the film under the conditions at which the operation is conducted. The film may exhibit hydrophobic or hydrophilic characteristics depending to some extent on the manner in which the film is to be used, and the film may be essentially unreactive with the complexing ions in the liquid barrier or at least some of the complexing ions. The films can be readily made and some are commerically available. The film membrane may be self-supporting and have sufficient strength not to require any additional supporting material on either of its sides during use. With some films, however, it may be necessary, advantageous or convenient to provide adequate support such as additional film or sheet-like materials on one or both sides of the film membrane. These supporting structures are frequently very thin materials and may be permeable to both liquids and gases and may not serve a separating function with respect to any component of the feed stream. Alternatively, the supporting film may be permeable to gases but not to liquids.

The film membrane may be in any desirable physical shape. Flat film sheets is one useable form, although greater surface areas and more efficient separation may be provided by using tubular fibers of the types disclosed in, for instance, U.S. Pat. No. 3,228,877, herein incorporated by reference. This patent describes a variety of hydrophobic or hydrophilic hollow fibers which may be employed in the present invention. The useful films include, for example, those of cellulose acetate, nylon, polyvinyl chloride, polyvinyl alcohols, polyvinyl acetate, polyesters, polystyrene, cation exchange resins such as divinylbenzene cross-linked, sulfonated polystyrene, olefin polymers such as polyethylene, polypropylene and ethylene-propylene copolymers, ethylene-vinyl acetate copolymers, ethylene-ethyl acrylate copolymers, silicone elastomers and the like. Suitable membranes are described in "Gas Permeability of Plastics," Major et al., Modern Plastics, page 135 et seq., July, 1962; and U.S. Pat. Nos. 3,133,132; 3,133,137; 3,256,675; 3,274,750; 3,325,330; 3,335,545; 3,396,510 and 3,447,286, all incorporated herein by reference. The film membranes may often have a thickness up to about 30 mils or more, and we prefer to employ membranes having a thickness up to about 5 or 10 mils. The film must have sufficient thickness to avoid rupture at the pressure employed, and often the films may have a thickness of at least about 0.001 mil.

The method of this invention can be employed alone to separate one or more unsaturated hydrocarbons, or it may be used in conjunction with other separating steps, for instance, a cryogenic operation, and still be economically advantageous compared with an all-cryogenic system. Although the aliphatically unsaturated hydrocarbon product provided by the method of this invention may be a quite pure material, for instance, of greater than 99 percent purity, the separation procedure may be used merely to provide a significant increase in the concentration of a given aliphatically unsaturated hydrocarbon in a mixture with other components of the feedstock.

The process of this invention can be employed to separate various aliphatically unsaturated hydrocarbons from other ingredients of the feed mixture providing at least one of the aliphatically unsaturated hydrocarbons exhibits a transfer rate across the liquid barrier that is greater than at least one other dissimilar or different component of the feedstock. Quite advantageously, the system can be used to separate aliphatically unsaturated hydrocarbons from other hydrocarbons which may be aliphatically saturated or aliphatically unsaturated, or from non-hydrocarbon materials, including fixed gases such as hydrogen. The feed mixture may thus contain one or more paraffins, including cycloparaffins, mono or polyolefins, which may be cyclic or acyclic, and acetylenes or alkynes, and these materials include aromatic structures having such aliphatic configurations in a portion of their structure. Often the feed mixture contains one or more other hydrocarbons having the same number of carbon atoms as the unsaturated hydrocarbon to be separated or only a one carbon atom difference. Among the materials that may be separated according to this invention are ethylene, propylene, butenes, butadiene, isoprene, acetylene and the like.

The liquid barrier contains sufficient water and soluble metal ions to form a suitable complex with at least one aliphatically unsaturated hydrocarbon component of the gaseous feed. The metal ions readily form the complex upon contact with the gaseous feed, and, in addition, the complex must be converted back to the metal ion and an unsaturated hydrocarbon component of the complex, under the conditions which exist on the discharge side of the semi-permeable membrane as employed in this invention. The released unsaturated hydrocarbons exit the discharge side of the membrane and can be removed from the vicinity of the membrane and its supporting structure as by a sweep gas or through the effect of vacuum on this side of the membrane. Thus the unsaturated hydrocarbon-metal complex forms and is decomposed during its travel through the complex metal ion-containing liquid barrier, and as a result the material passing through the barrier is more concentrated with respect to at least one aliphatically unsaturated hydrocarbon component present in the feed stream.

Often the reactivity of aliphatically unsaturated hydrocarbons with the complexing metal ions in their order of decreasing activity goes from acetylenes or dienes to monoolefins, the saturated hydrocarbons being essentially non-reactive. Also different reactivities may be exhibited among the various members of a given one of these types of unsaturated hydrocarbons. The process of this invention can thus be used to separate paraffins from monoolefins, diolefins or acetylenes; diolefins from monoolefins; or acetylenes from paraffins, monoolefins or diolefins; as well as to separate a given aliphatically unsaturated hydrocarbon from another of such materials in the same class where the members have differing transport rates across the liquid barrier. The feed gas need only contain a small amount of unsaturated hydrocarbon, as long as the amount is sufficient so that the unsaturated material to be separated selectively reacts with the metal ions to a significant extent, and thus at least one other component of the field is less reactive or non-reactive with the complex-forming metal ions.

The aliphatically unsaturated materials of most interest with regard to separation by the method of the present invention, have two to about eight carbon atoms, preferably two to four carbon atoms. The separation of ethylene or propylene from admixtures with other normally gaseous materials, such as one or more of ethane, methane, propane and hydrogen is of particular importance. Frequently, the mixtures serving as a source of the ethylene-containing feed for the process contain about 1 to 50 weight percent ethylene, about 0 to 50 weight percent ethane and about 0 to 50 weight percent methane. Another process that may be of special significance is the separation from ethylene of minor amounts of acetylene.

The partial pressure of the aliphatically unsaturated component of the gaseous feed at the input side of the liquid barrier used in the present invention is greater than the partial pressure of this unsaturated hydrocarbon on the discharge or exit side of the liquid barrier-semi-permeable membrane combination. The pressure drop of the unsaturated hydrocarbon to be separated may often be at least about 0.5 pounds per square inch, and is preferably at least about 20 psi, although the pressure drop should not be so great that the liquid barrier is ruptured or otherwise deleteriously affected to a significant extent. Conveniently, the total pressure of the gaseous feed is up to about 1,000 pounds per square inch. The discharge partial pressure of the unsaturated hydrocarbon can preferably be controlled by subjecting the exit side of the liquid barrier-film combination to the action of a sweep gas that is essentially inert to forming a complex with the metal ions in solution in the liquid barrier. The sweep gas picks up the discharged aliphatically unsaturated components, and the sweep gas may be selected so that it can be readily separated from the unsaturated hydrocarbon material if that be necessary for the subsequent use of the unsaturated hydrocarbon. Unless a reaction with the separated hydrocarbon is desired, the sweep gas should be relatively inert therewith and may be, for instance, butane, carbon dioxide or the like.

The temperature across the liquid barrier employed in the method of this invention can be essentially constant or it may vary, and decomposition of the metal-unsaturatedhydrocarbon complex can be effected primarily by the drop in partial pressure of the aliphatically unsaturated hydrocarbon on the exit side of the liquid barrier compared with the partial pressure on the feed side. Conveniently, the temperature of the liquid barrier may be essentially ambient in the case of feedstocks that are gaseous at this temperature and the pressure employed on the feed side of the liquid barrier. The temperature of the liquid barrier may, however, be reduced or elevated from ambient temperature. Often the temperature may be up to about 100° C., and elevated temperatures may even be required to put the feedstock in the gaseous or vapor phase. Neither the temperature nor the pressure used should, however, be such as to destroy the difference in transport rate across the liquid barrier of the aliphatically unsaturated hydrocarbons whose separation is sought, compared with that of the other components of the feed. These conditions should also not be such that physical disruption of the liquid barrier or any other significant malfunction results.

In the present invention we may use the metals which serve in the form of metal-containing cations to separate aliphatically unsaturated hydrocarbons in the feed mixture through the formation of metal complexes of desired properties, and these metals include, for instance, the transition metals of the Periodic Chart of Elements having atomic numbers above 20. Included in these metals are those of the first transition series having atomic numbers from 21 to 29, such as chromium, copper, especially the cuprious ion, manganese and the iron group metals, e.g., nickel and iron. Others of the useful complex-forming metals are in the second and third transition series, i.e., having atomic numbers from 39 to 47 or 57 to 79, as well as mercury, particularly as the mercurous ion. Thus we may employ noble metals such as silver, gold and the platinum group, among which are platinum, palladium, rhodium, ruthenium and osmium. The useful base metals of the second and third transition series include, for example, molybdenum, tungsten, rhenium and the like. Various combinations of these complexing-forming metals may also be employed in this invention, either in the presence or absence of other non-metal or non-complexing metal cations.

The metal is provided in the aqueous liquid barrier in contact with the semi-permeable membrane in a form which is soluble in this liquid. Thus the various water-soluble salts of these metals can be used such as the nitrates and halides, for instance, the bromides and chlorides, fluoborates, fluosilicates, acetates, carbonyl halides or other salts of these metals which can serve to form the desired water-soluble complexes. The metal salts should not react with any components of the aliphatically unsaturated hydrocarbon-containing feed to form an insoluble material which could block the film membrane or otherwise prevent the separation of the desired component of the feedstock. Also in a given system, the metal is selected so that the complex will readily form and yet be sufficiently unstable so that the complex will decompose and the dissociated hydrocarbon leave the liquid barrier, thereby providing a greater concentration of the aliphatically unsaturated hydrocarbon to be separated from the exit side of the membrane than in the feed. The concentration of the metal ions in the liquid barrier may be rather low and still be sufficient to provide an adequate complexing rate so that excessive amounts of the semi-permeable surface will not be needed to perform the desired separation. Conveniently, the concentration of the complex-forming metal ions in the aqueous solution forming the liquid barrier is at least about 0.1 molar, and is preferably about 0.5 to 12 molar. Advantageously, the solution is less than saturated with respect to the complex-forming metal ions to insure that essentially all of the metal stays in solutions, thereby avoiding any tendency to plug the film membranes and destroy its permeability characteristics.

When the complexing ions in the liquid barrier employed in this invention are cuprous ions, ammonium ions can be used to provide copper ammonium complex ions which are active to form a complex with the aliphatically unsaturated hydrocarbons to be separated. We preferably supply about equimolar amounts of cuprious and ammonium ions in the liquid barrier solution, although either type of ions may be in excess. The ammonium ions can be provided in various convenient ways, preferably as an acid salt such as ammonium chloride. In order to enhance the selectivity of the copper ammonium ion complex in the separation of this invention, we may also make the liquid barrier solution more acidic, by, for instance, providing a water-soluble acid such as a mineral acid, especially hydrochloric acid in the solution. Preferably, the pH of the liquid barrier in this form of the invention is below about 5 with the acid in the solution. Since silver may form undesirable acetylides with acetylenes, the copper ammonium complex may be a more attractive complexing agent when it is desired to separate acetylenes from its various mixtures.

Instead of supplying only a novel metal for complexing the aliphatically unsaturated hydrocarbon in the process of this invention, we may also employ mixtures of noble metal and other cations. Work has shown that as the noble metal concentration increases the selectivity of the desired separation may be enhanced, and a portion of the noble metal may be replaced by non-noble metal or ammonium ions and selectivities generally comparable to those obtained with the same concentration of noble metal ions may be obtained. This result has been reached even though the non-noble metal or ammonium ion when used by itself in an effort to accomplish the desired separation, may be ineffective or only marginally suitable. Accordingly, the total of such ions in the liquid barrier may be composed of a minor or major amount of either the noble metal ions or the non-noble metal, ammonium or other cations. Solutions having a major amount of the non-noble metal, ammonium or other cations not containing a noble metal will generally be less expensive, and, accordingly, the noble metal may be as little as about 10 molar percent or less of the total cations in the solution. To reduce expenses at least about 10 molar percent, preferably at least about 50 molar percent, of the total cations may be other than the noble metal cations. The non-noble or base metals are preferably of Groups II to VIII of the Periodic Chart of Elements, and especially those in the fourth and fifth periods, aluminum and magnesium. Zinc and cupric ions are preferred ones among these non-noble or base metal ions. The various cations may be provided in the liquid barrier in the form of any suitable compound such as the acid salt forms mentioned above with respect to the noble metals.

The amount of water in the liquid barrier employed in this invention may be a minor portion of the liquid phase, but preferably is a major portion or even essentially all of the liquid, on a metal salt-free basis. Thus small amounts of water, say as little as about 5 weight percent, on a salt-free basis in the liquid phase may serve to provide significant transport for the aliphatically unsaturated hydrocarbons across the liquid barrier. Any other liquid present in the barrier is preferably water-miscible and should be chosen as not to have a substantial deleterious effect on the separation to be accomplished.

The method of this invention will be further described with reference to the following specific examples.

EXAMPLE I

A glass test cell was divided into upper and lower compartments by locating a semi-permeable film membrane horizontally across the cell. The cell internal cross-sectional area was 2.8 cm.$^2$ and the cross-section was fully covered by the film. The main body of the cell had a height of 41 mm. and a gas outlet at each end. A feed inlet tube entered the upper end of the cell and opened about 5 mm. above the membrane and a sweep gas inlet tube entered the lower end of the cell and opened about 5 mm. below the membrane. The feed was charged into the upper portion of the cell, and the exhaust or raffinate components of the gas left the cell by the upper outlet. The feed rate was considered to be sufficient to maintain a constant gas composition on the inlet side of the membrane. A sweep gas contacted the lower surface of the membrane, picked-up the materials leaving the membrane and then exited the cell by the lower outlet as a product stream. The product was analyzed by gas chromatography. Permeation rates were calculated from the amount of hydrocarbon in the sweep gas, the sweep gas flow rate, and the response of the gas chromatographic detector to 1 milliliter of the product gas mixture.

The membrane was composed of a lower layer of a hydrophobic silicone polycarbonate film (XD-1, General Electric) having a thickness of 0.6 mil. The film was in contact with an upper layer of material which was a cellulose acetate filter membrane having pores of 1.2 microns. Three membranes of this type were made and were saturated with aqueous solutions of one molar silver nitrate, one molar silver nitrate solution containing 0.5 percent (salt-free basis) polyvinyl alcohol, and one molar silver nitrate solution containing 4.0 percent (salt-free basis) of polyvinyl alcohol, respectively.

The cell equipped with one of these membranes was used to separate ethylene from a mixed hydrocarbon gas stream while employing silver ions as the complexing metal. Each membrane was tested. The feed gas was a mixture of 22.3 percent methane, 36.7 percent ethane and 41.0 percent ethylene, the gas was fed to the cell at 10 psig and was flowed through the cell at the rate of 30 ml./min. The reverse or exit side of the membrane was swept with helium at the rate of 10 ml./min. The results of these tests were as follows:

TABLE I

| Cell | Barrier Liquid | Weight % Ethylene in Permeate Time On-Stream, min, | | | | | |
|---|---|---|---|---|---|---|---|
| | | 1 | 5 | 10–12 | 20–22 | 60 | 93 |
| A | 1 molar silver nitrate | 51 | — | — | — | — | — |

TABLE I—Continued

| Cell | Barrier Liquid | Weight % Ethylene in Permeate Time On-Stream, min. | | | | | |
|---|---|---|---|---|---|---|---|
| B | 1 molar silver nitrate, 0/5% polyvinyl alcohol | 97 | 94 | 80 | 73 | — | — |
| C | 1 molar silver nitrate, 4% polyvinyl alcohol | 96 | 98 | 97 | 97 | 97 | 97 |

The results shown in Table I demonstrate the value of adding a non-volatile, hygroscopic material to the aqueous silver solution. Without polyvinyl alcohol present, the membrane dried sufficiently in less than one minute after the start of the experiment that we did not get any selectivity from the silver nitrate solution. The slight increase in ethylene content is due to the selectivity of the XD-1 membrane. With 0.5 percent polyvinyl alcohol selectivity was retained for 5 minutes before there was a slow decay of selectivity. With 4.0 percent polyvinyl alcohol, we did not observe any loss of selectivity for 93 minutes when the experiment was concluded. These tests demonstrate the importance of incorporating hygroscopic materials to retard loss of water.

EXAMPLE II

A separation was conducted using a hydrocarbon feed and cell similar to those described in Example I. The film membrane, however, was composed of a 0.65 micron pore size cellulose acetate filter supported on a 0.3 mil, silicone polycarbonate film (XD-1). The filter was saturated with a solution of 6 M aqueous silver nitrate containing in solution 5 percent (salt-free basis) polyvinyl alcohol. The test conditions were 30 ml./min. feed gas rate through the cell at 40 psig, and 10 ml./min. sweep gas. The results were as follows:

TABLE II

| Permeation Rate, ml./min. | Product Composition (Helium Free) | | | S.F.* |
|---|---|---|---|---|
| | % CH$_4$ | % C$_2$H$_4$ | % C$_2$H$_6$ | |
| (Feed Composition | 22.3 | 41.0 | 36.7) | — |
| 0.471 | 0.042 | 99.948 | 0.010 | 2750 |

$$*S.F. = \frac{\text{Conc. of C}_2\text{H}_4 \text{ in Permeate}}{\text{Conc. of CH}_4+\text{C}_2\text{H}_6 \text{ in Permeate}} \times \frac{\text{Conc. of CH}_4+\text{C}_2\text{H}_6 \text{ in Feed}}{\text{Conc. of C}_2\text{H}_4 \text{ in Feed}} = \text{selectivity factor}$$

EXAMPLE III

Ethylene was separated from a feed gas mixture using a cell similar to that of Example I, but with a sandwich film membrane in which a 1.2 micron pore size cellulose acetate filter was held between two silicone polycarbonate films (SX-1) each having a thickness of 0.15 mil. The filter was soaked in 6 molar aqueous silver nitrate solution having dissolved therein 5 percent (salt-free basis) polyvinyl alcohol. The feed gas has a flow rate through the cell of 30 ml./min. and the sweep gas was nitrogen supplied to the cell at the rate of 10 ml./min. The results of several tests run in this manner were as follows:

TABLE III

| Feed Gas Inlet Pressure, Psig. | Permeation Rate ml./min. | Permeate Composition (Nitrogen Free) | | | S.F. |
|---|---|---|---|---|---|
| | | % CH$_4$ | % C$_2$H$_4$ | % C$_2$H$_6$ | |
| (Feed Composition | — | 22.3 | 41.0 | 36.7) | — |
| 10 | 0.178 | 0.084 | 99.90 | 0.015 | 1459 |
| 20 | 0.244 | 0.088 | 99.89 | 0.019 | 1354 |
| 40 | 0.364 | 0.092 | 99.87 | 0.035 | 1149 |
| 80 | 0.657 | 0.109 | 99.85 | 0.037 | 996 |

EXAMPLE IV

A gel (hereinafter designated as Gel A) was made by mixing one liquid part of a 112.5 weight percent solution of water-soluble polyvinyl alcohol in dimethyl sulfoxide (DMSO) that was one molar in silver nitrate, and one liquid part of a 20 weight percent solution of toluene diisocyanate in DMSO. This mixing occurred in a flat-bottomed receptacle. After 20 minutes the mixture gelled, and the gel was removed from the bottom of the receptacle and washed with water. The gel had formed as a hydrophilic film of 15 to 20 mils thickness, and was stored between two pieces of filter paper until it was used as Gel A as indicated below. Another gel was made in a similar manner except no silver nitrate solution was contained in the gel-forming mixture. After the gel was made it was water washed and blotted dry. The film was then immersed for 2 days in a 1 molar aqueous solution of silver nitrate. The membrane designated Gel B below, was removed from the solution and blotted dry.

A test cell similar to that described in Example I was divided into upper and lower compartments by locating either the Gel A film or the Gel B film horizontally across the cell. A humidified feed was charged into the upper portion of the cell at the rate of 10 ml./min. and the feed rate was considered to be sufficient to maintain a constant gas composition on the inlet side of the membrane. A sweep gas (10 ml./min. of helium) contacted the lower surface of the membrane, picked-up the materials leaving the membrane and then exited the cell by the lower outlet as a product stream. The tests were at ambient temperature.

The results of these tests are given in Table IV. The data show the selectivity of the system for separating ethylene.

TABLE IV

| Gel | Inlet Gas Pressure (psig.) | Permeation Rate (ml./cm.² min.) | Composition of Permeate (Weight %, He-free) | | | S.F. |
|---|---|---|---|---|---|---|
| | | | % $CH_4$ | % $C_2H_4$ | % $C_2H_6$ | |
| (Feed Composition | — | | 21.1 | 46.4 | 32.5) | — |
| A | 50 | $3.8 \times 10^{-4}$ | 4.6 | 85.0 | 10.4 | 9.8 |
| B | 30 | $1.3 \times 10^{-2}$ | 0.35 | 99.0 | 0.65 | 106.5 |

Each film performed the desired separation and the better performance of Gel B may be due to a loss of silver nitrate from Gel A during washing.

EXAMPLES V AND VI

A membrane was made by dissolving five parts by weight of Elvamide 8061 nylon resin (DuPont), which is an alcohol-soluble polyamide, and 0.50 part by weight of water-soluble polyvinyl alcohol in 94.5 parts by weight of DMSO. The mixture was warmed to dissolve the polymer, and cast onto a glass plate using a 6 mil Bird applicator. The resulting hydrophilic film was dried for 30 minutes in an oven at 45°C. The film was then quenched in distilled water and kept immersed for 20 hours. The film was dried with filter paper, and soaked in a six normal aqueous silver nitrate solution for 2 hours. The film was removed from the solution, dried and then tested in an apparatus similar to that described in Example I.

The hydrocarbon feed used in the test was saturated with water vapor and charged to the cell at 10 psig and a rate of 25 ml./min. Nitrogen was used as the sweep gas to remove the permeate. The results were as follows:

TABLE V

| | % $CH_4$ | % $C_2H_4$ | % $C_2H_6$ | % $C_3H_8$ | % Olefins |
|---|---|---|---|---|---|
| Feed | 13.39 | 31.80 | 22.59 | 32.22 | 64.02 |
| Permeate | 2.90 | 52.25 | 4.79 | 40.07 | 92.32 |

The selectivity factor for olefins obtained in the test was 6.74.

EXAMPLE VII

A 20 mil film of sodium cellulose xanthate was cast onto a clean glass plate by using a 10 weight percent aqueous mixture. The film was coagulated by placing the coated glass plate in a 0.18 molar hydrochloric acid bath for 30 minutes. The film was washed repeatedly with distilled water and allowed to dry to the touch. A portion of this gel membrane was placed in an aqueous solution of six molar silver nitrate containing 5 weight percent water-soluble polyvinyl alcohol of low molecular weight. The hydrophilic membrane remained in the solution for 2 hours and was then blotted to dry. The resulting gel membrane is designated Gel C hereinbelow.

EXAMPLE VIII

The gel membrane made as described in Example VII was tested for its suitability in separating ethylene from a mixture also containing methane and ethane. The test cell was similar to that described in Example I. The feed gas was passed through water at 100°F. and supplied to the cell at the rate of 10 ml./min. under pressure. The purge or sweep gas was helium which was used at the rate of 10 ml./min. The test showed that system was effective for separating ethylene and the results were as follows:

TABLE VI

| Gel | Feed Pressure, psig. | Permeation Rate, ml./cm.² min. | Permeate Composition, Wt. % (Helium Free) | | | S.F. |
|---|---|---|---|---|---|---|
| | | | $CH_4$ | $C_2H_4$ | $C_2H_6$ | |
| (Feed Composition) | | | 22.3 | 41.8 | 35.9) | |
| C | 10 | $18.4 \times 10^{-3}$ | 0.2 | 99.3 | 0.5 | 171 |

EXAMPLE X

A membrane was made by dissolving 27 grams of Elvamide 8061 nylon resin (DuPont) and 3 grams of water-soluble polyvinyl alcohol in 120 ml. of DMSO. The mixture was warmed to 200°F. to dissolve the polymer, and then cast onto a glass plate using a 6 mil Bird applicator. The resulting film was partially dried for a minute in a vacuum oven at 85°C., 15 inches of vacuum and 500 ml./min. of air. The film was then quenched in a 0.5% $NaNO_3$ brine. The hydrophilic film was removed from the brine, dried and then tested in an apparatus similar to that described in Example III.

In the test, 0.5 ml. of 5N $AgNO_3$ was placed on top of the membrane. The cell was closed and pressurized on the feed side to 20 psig. After several hours the $AgNO_3$ solution had been forced into the film. The hydrocarbon feed used in the test was humdified with water vapor and charged to the cell at 10 psig initially and then at 20 psig, all at a rate of 25 ml./min. Humidified nitrogen was used as the sweep gas to remove the permeate. The results were as follows:

TABLE VII

| Time Since Start-up (Min.) | Pressure (psig) | Permeation Rate (ml./cm.²min.) | Composition of Permeate, Wt.% ($N_2$-free) | | |
|---|---|---|---|---|---|
| | | | % $CH_4$ | % $C_2H_4$ | % $C_2H_6$ |
| (Feed | — | — | 18.8 | 50.8 | 30.4) |
| 25 | 10 | .0018 | .085 | 99.51 | .407 |
| 36 | 10 | .0042 | .228 | 99.37 | .397 |
| 63 | 10 | .0057 | .086 | 99.82 | .097 |
| 90 | 10 | .0043 | .130 | 99.78 | .094 |
| 97 | 10 | .0050 | .068 | 99.87 | .065 |
| 114 | 20 | .0143 | .190 | 99.69 | .120 |
| 160 | 20 | .0099 | .047 | 99.92 | .031 |
| 167 | 20 | .0100 | .084 | 99.83 | .083 |
| 180 | 20 | .0108 | .064 | 99.88 | .054 |
| 200 | 20 | .0098 | .149 | 99.65 | .198 |

EXAMPLE XI

The effectiveness in the separation of ethylene of film membranes which are blends of nylon and polyethylene glycol diacrylate (PEGD) or polyoxypropylene glycol (PPG) is demonstrated by the following experiments. Three different films were compared — one was nylon, another was a nylon-PEGD blend, and the third was a nylon-PPG blend. The films were prepared by casting solutions of the polymers onto glass plates coated with polyethylene using a 6 mil Bird applicator. The solutions had the following composition: (1) 5.0 gms. of Elvamide 8061 nylon, 50 ml. of $CHCl_3$, and 50 ml of $CH_3OH$; (2) 5.0 gms. of Elvamide 8061 nylon, 0.5 gm. of PEGD, 50 ml. of $CHCl_3$ and 50 ml. of $CH_3OH$, and (3) 5.0 gms. of Elvamide 8061 nylon, 0.5 gm. of PPG, 50 ml. of $CHCl_3$ and 50 ml. of $CH_3OH$. Two layers of each polymer were laid down to provide a film of each polymer composition about 0.6 mil thick. After the solvent had evaporated, the films were annealed in an oven at 125°C. for 3 minutes.

These films were tested in an apparatus similar to that described in Example I. The membrane was put into the cell and 0.3 ml of 6 N $AgNO_3$ was added above the membrane. This solution was slowly pushed into the membrane with pressure. A feed consisting of methane, ethane, and ethylene was supplied to the upper side of the membrane at 40 psig with a bypass rate of 10 ml./min. A $N_2$ purge swept the reverse side of the membrane and picked up the gas permeating through the membrane. Gas chromatography was used to determine the composition of the permeate as well as the permeation rate. The feed and sweep gas were both humidified by bubbling them through water scrubbers. The test results are given in Table VIII.

ment in selectivity obtained with the nylon-PPG blend and then there was a loss in selectivity after four days continuous testing due to possible reaction of silver ions with PPG. The addition of more $AgNO_3$ to the film should again improve its selectivity.

EXAMPLE XII

A blend of 50 gms. of formaldehyde-alcohol modified 6:6 nylon (BCI-819, Belding Chemical Industries), 60 gms. of polyvinyl alcohol and 120 ml. of DMSO was made as an extrusion mix, by first mixing the dry polymers and then adding the DMSO. The resulting slurry was heated in an extruder feed tank at 250°F. for 1.5 hours to melt the polymers and degas the blend for extrusion. Extrusion of the mixture was conducted under a nitrogen pressure between 200 and 1,000 psi on the feed tank and with the extruder head at 170°F. Hollow fibers of the polymer blend were formed through an annular die having an opening of 0.070 inch. During extrusion, air was blown through the center of the fiber. After extrusion the fibers were stretched to 25 to 75 percent of their original length by applying a controlled stress to the fibers while heating them to 150°–200°F. The stretched fibers were crosslinked by immersion in a 3 percent p-toluenesulfonic acid in 10 percent aqueous sodium sulfate bath for 90 minutes at 50°–60°C. The fibers were then washed repeatedly with water to remove the salt from them and allowed to dry.

The ends of three of these fibers were then potted together in a 2½ inch by ¼ O.D. stainless steel tube with Armstrong's C-4 epoxy resin. The resin was cured with Armstrong's Activator "D" by heating the resin-activator mixture at 80°C. for 60 minutes. The other

TABLE VIII

| Film | Ethylene In Permeate, Wt. % | | | S.F. | Permeation Rate ml./cm.²min. |
|---|---|---|---|---|---|
| | % $CH_4$ | % $C_2H_4$ | % $C_2H_6$ | | |
| (Feed Composition | 18.8 | 40.9 | 40.2) | — | — |
| Nylon | 0.52 | 98.62 | 0.86 | 103 | 0.0044 |
| Nylon + PEGD | 0.52 | 98.58 | 0.90 | 100 | 0.0066 |
| Nylon + PPG (1st day) | 0.16 | 99.76 | 0.08 | 600 | 0.013 |
| Nylon + PPG (4th day) | 1.37 | 91.57 | 7.07 | 16 | 0.024 |

These test results clearly show the increase in permeability of the nylon-PEGD blend film compared with nylon. The results also show the advantage in increased permeability of the nylon-PPG blend film over nylon by itself. In the latter case, there was an initial improve-ends of the fibers were potted similarly in a different tube. Potting was done in such a manner such that removal of a small amount of the potting compound could be done to expose open ends of each of the fibers.

The potted fiber bundle was allowed to soak for 16 hours in a 6M AgNO₃ solution. The fiber bundle was then assembled into a hollow fiber test cell in which the fibers had a total membrane area of 23.4 cm.² This cell was then supplied with a pressurized 10 ml./min. stream of mixture of ethylene, ethane, and methane. The feed was supplied to the outside of the fibers and was humidified by bubbling it through water at 145°F. before reaching the cell. The inside of the fibers was continually purged with a 10 ml./min. stream of helium which picked up any material which permeated the fibers. A gas chromatographic analysis of the purge stream was used to determine the permeation rate of and selectivity to ethylene of the fibers. As can be seen from Table IX the unit successfully separated ethylene from the feed mixture.

TABLE IX

| Pressure, PSIG | Permeate Composition (wt%, He-free) | | | S.F. | Permeation Rate ml./cm.²-min. |
|---|---|---|---|---|---|
| | Methane | Ethylene | Ethane | | |
| (Feed | 18.1 | 50.2 | 31.7) | — | — |
| 5 | 0.15 | 99.85 | 0 | 659 | $8.59 \times 10^{-4}$ |
| 10 | 0.12 | 99.88 | 0 | 840 | $1.22 \times 10^{-3}$ |
| 20 | 0.15 | 99.73 | 0.12 | 351 | $1.70 \times 10^{-3}$ |

It is claimed:

1. A method for separating aliphatically unsaturated hydrocarbon of two to about eight carbon atoms which comprises contacting from a first side of an essentially solid, water-insoluble, semi-permeable membrane, a vaporous mixture containing said unsaturated hydrocarbon with an aqueous liquid barrier disposed in a solid matrix which is said membrane or is in contact with said semi-permeable membrane, said liquid barrier having metal ions which combine with said unsaturated hydrocarbon to form a water-soluble complex, and said liquid barrier being in contact with sufficient amount of a relatively non-volatile, hygroscopic agent to reduce the loss of water from the liquid barrier, the partial pressure of said unsaturated hydrocarbon on a second side of said semi-permeable membrane being sufficiently less than the partial pressure of said unsaturated hydrocarbon in said vaporous mixture to provide separated unsaturated hydrocarbon on said second side of said semi-permeable membrane, and removing separated unsaturated hydrocarbon from the vicinity of said second side of said semi-permeable membrane.

2. The method of claim 1 in which the hygroscopic agent is polyvinyl alcohol.

3. A method for separating aliphatically unsaturated hydrocarbon of two to four carbon atoms which comprises contacting from a first side of a semi-permeable membrane, a vaporous mixture containing said aliphatically unsaturated hydrocarbon with an aqueous liquid barrier disposed in a solid matrix which is said membrane or in contact with said semi-permeable membrane, said membrane being essentially solid, water-insoluble, and permeable to said vaporous mixture in the absence of said aqueous, said liquid barrier having metal ions which combine with said unsaturated hydrocarbon to form a water-soluble complex, and said liquid barrier being in contact with sufficient amount of a relatively non-volatile, hygroscopic agent to reduce the loss of water from the liquid barrier, the side of said semi-permeable membrane being sufficiently less than the partial pressure in said vaporous mixture to provide separated unsaturated hydrocarbon on said second side of said semi-permeable membrane, and removing unsaturated hydrocarbon from the vicinity of said second side of said semi-permeable membrane.

4. The method of claim 3 in which said unsaturated hydrocarbon separated is ethylene.

5. The method of claim 4 in which the ethylene is in admixture with one or both of methane and ethane.

6. The method of claim 5 in which the hygroscopic agent is polyvinyl alcohol.

7. The method of claim 1 in which said metal ions are noble metal ions.

8. The method of claim 7 in which said noble metal ions are silver.

9. The method of claim 8 in which said hygroscopic agent is polyvinyl alcohol.

10. The method of claim 8 in which the unsaturated hydrocarbon separated is ethylene.

11. The method of claim 10 in which the ethylene is in admixture with one or both of methane and ethane.

12. The method of claim 11 in which the hygroscopic agent is polyvinyl alcohol.

13. The method of claim 12 in which the liquid barrier is disposed in a porous matrix positioned on the feed side of said semi-permeable film.

14. The method of claim 12 in which the liquid barrier is disposed in said semi-permeable membrane.

15. The method of claim 1 in which the liquid barrier is disposed in a porous matrix positioned on the feed side of said semi-permeable film.

16. The method of claim 1 in which the liquid barrier is disposed in said semi-permeable membrane.

17. The method of claim 16 in which the complexing metal ions are noble metal ions.

18. The method of claim 17 in which said membrane is hydrophilic.

19. The method of claim 18 in which the noble metal ions are silver ions.

20. The method of claim 19 in which the aliphatically unsaturated hydrocarbon separated is ethylene.

21. The method of claim 20 in which the ethylene is in admixture with one or both of methane and ethane.

22. The method of claim 21 in which the hygroscopic agent is polyvinyl alcohol.

* * * * *

UNITED STATES PATENT OFFICE
CERTIFICATE OF CORRECTION

Patent No. 3,844,735         Dated October 29, 1974

Inventor(s) EDWARD F. STEIGELMANN and ROBERT D. HUGHES

It is certified that error appears in the above-identified patent and that said Letters Patent are hereby corrected as shown below:

IN THE ABSTRACT:

Line 11, after the word "matrix" the "comma" should be a -- period --;

IN THE SPECIFICATION:

Column 3, line 37, "porpylene" should be -- propylene --;
Column 7, line 57, there should be a space between the words "unsaturatedhydrocarbons", to wit -- unsaturated hydrocarbons --;
Column 8, line 58, after the words "semi-permeable" the word -- membrane -- should appear;
Column 8, line 66, "solutions" should be -- solution --;
Column 8, line 67, "membranes" should be -- membrane --;
Column 9, line 7, "cuprious" should be -- cuprous --;
Column 11, TABLE I, 2nd left-hand subheading opposite "B", "0/5%" should be -- 0.5% --;
Column 12, line 15, "(SX-1)" should be -- (XD-1) --;
Column 12, line 38, "112.5" should be -- 12.5 --;
Column 13, line 59, "6.74" should be -- 6.75 --;
Column 14, TABLE VI, "(Feed Composition)" should be -- (Feed Composition --;
Column 14, line 63, "humdified" should be -- humidified --;
Column 16, line 47, after "1/4" insert -- inch --;
Column 17, line 6, after the first "of" insert -- a --;

IN THE CLAIMS:

Claim 3, Column 17, line 58, after "or" insert -- is --;
Claim 3, Column 18, line 3, between "the" and "side" insert -- partial pressure of said unsaturated hydrocarbon on a second --.

Signed and sealed this 29th day of April 1975.

(SEAL)
Attest:

RUTH C. MASON
Attesting Officer

C. MARSHALL DANN
Commissioner of Patents
and Trademarks